United States Patent
Wahlberg et al.

(10) Patent No.: US 8,948,080 B2
(45) Date of Patent: Feb. 3, 2015

(54) METHODS COMPRISING SATELLITES HAVING A REGENERATIVE PAYLOAD, ONBOARD COMPUTER, PAYLOAD INTERFACE AND INTERFERENCE ELIMINATION SYSTEM

(75) Inventors: Per Wahlberg, Nacka (SE); Kennet Lejnell, Ekero (SE)

(73) Assignee: OverHorizon (Cyprus) PLC, Nicosia (CY)

( * ) Notice: Subject to any disclaimer, the term of this patent is extended or adjusted under 35 U.S.C. 154(b) by 1642 days.

(21) Appl. No.: 11/779,228

(22) Filed: Jul. 17, 2007

(65) Prior Publication Data
US 2009/0022088 A1    Jan. 22, 2009

(51) Int. Cl.
*H04B 7/212* (2006.01)
*H04B 7/185* (2006.01)

(52) U.S. Cl.
CPC .................. *H04B 7/18532* (2013.01)
USPC ........... 370/321; 370/315; 370/389; 370/280; 370/329; 370/264; 455/67.11; 455/423; 455/562.1; 455/449; 455/424

(58) Field of Classification Search
CPC ...... F23J 13/08; F23J 2213/70; F23L 11/005; F24B 1/192; H04B 7/18532
USPC .......... 455/12.1, 432.1–453, 553.1, 426, 331, 455/10, 509, 67.1, 67.11, 423, 562.1, 449, 455/424; 370/321, 252, 329, 337, 401, 468, 370/259, 315, 316, 389, 280, 264, 265
See application file for complete search history.

(56) References Cited

U.S. PATENT DOCUMENTS

| 4,345,256 A | 8/1982 | Rainwater |
| 5,506,780 A | 4/1996 | Montenbruck et al. |

(Continued)

FOREIGN PATENT DOCUMENTS

| EP | 858176 | 8/1998 |
| EP | 915529 | 5/1999 |

(Continued)

OTHER PUBLICATIONS

Bell, K. D. et al: "Balancing Performance and Cost for Cost-Effective Satellite Systems Design Using an Integrated Cost Engineering Model," Aerospace Applications Conference, 1995. Proceedings., 1995 IEEE Aspen Co., pp. 153-167.

(Continued)

*Primary Examiner* — Babar Sarwar
(74) *Attorney, Agent, or Firm* — White & Case LLP

(57) ABSTRACT

Systems and methods of satellite communications for moving terminals, including but not limited to on-the-move and mobile terminals (e.g., on-the-pause terminals), are implemented in certain embodiments using smaller antennas (e.g., aperture area with diameter less than 50 cm), open standard waveforms to secure availability from several suppliers, payment for service only when using the terminal, interference avoidance to adjacent satellites, and low cost. Low cost is achieved in part by operating at frequency bands that are currently operated by terrestrial microwave links so that existing low cost microwave components are utilized. The system also includes an interference elimination system that continuously monitors for interference to adjacent satellites from a user terminal's uplink signal. If interference is detected, the interference elimination system remedies the interference by performing one or more of the following: shutting down the interfering terminal(s), changing transmission parameters, changing the beam coverage on ground, changing the frequency of the affected traffic, or moving the satellite to a new orbital position. The interference elimination system may also transit the interference information to a control center.

60 Claims, 6 Drawing Sheets

(56) References Cited

U.S. PATENT DOCUMENTS

| | | | |
|---|---|---|---|
| 5,566,354 A | 10/1996 | Sehloemer | |
| 5,736,959 A | 4/1998 | Patterson et al. | |
| 5,765,098 A | 6/1998 | Bella | |
| 5,805,067 A | 9/1998 | Bradley et al. | |
| 5,896,558 A | 4/1999 | Wiedman | |
| 5,925,092 A | 7/1999 | Swan et al. | |
| 5,995,841 A | 11/1999 | King et al. | |
| 6,005,525 A * | 12/1999 | Kivela | 343/702 |
| 6,021,309 A | 2/2000 | Sherman et al. | |
| 6,023,606 A | 2/2000 | Monte et al. | |
| 6,032,041 A | 2/2000 | Wainfan et al. | |
| 6,067,442 A | 5/2000 | Wiedeman et al. | |
| 6,072,768 A | 6/2000 | Wiedeman et al. | |
| 6,097,957 A | 8/2000 | Bonta et al. | |
| 6,101,385 A | 8/2000 | Monte et al. | |
| 6,125,261 A | 9/2000 | Anselmo et al. | |
| 6,128,487 A | 10/2000 | Wiedeman | |
| 6,147,640 A | 11/2000 | Wachs | |
| 6,160,994 A | 12/2000 | Wiedeman | |
| 6,169,881 B1 | 1/2001 | Astrom et al. | |
| 6,222,499 B1 | 4/2001 | Goetz et al. | |
| 6,236,834 B1 | 5/2001 | Poskett et al. | |
| 6,246,874 B1 | 6/2001 | Voce | |
| 6,275,677 B1 | 8/2001 | Tandler | |
| 6,324,381 B1 | 11/2001 | Anselmo et al. | |
| 6,339,707 B1 | 1/2002 | Wainfan et al. | |
| 6,459,898 B1 | 10/2002 | Yegenoglu et al. | |
| 6,463,279 B1 | 10/2002 | Sherman et al. | |
| 6,538,612 B1 | 3/2003 | King | |
| 6,570,859 B1 | 5/2003 | Cable et al. | |
| 6,574,794 B1 | 6/2003 | Sarraf | |
| 6,594,469 B1 | 7/2003 | Serri et al. | |
| 6,594,706 B1 | 7/2003 | DeCoursey et al. | |
| 6,704,543 B1 | 3/2004 | Sharon et al. | |
| 6,708,029 B2 | 3/2004 | Wesel | |
| 6,735,440 B2 | 5/2004 | Wiedeman et al. | |
| 6,775,519 B1 * | 8/2004 | Wiedeman et al. | 455/12.1 |
| 6,804,514 B2 | 10/2004 | Wiedeman et al. | |
| 6,879,829 B2 | 4/2005 | Dutta et al. | |
| 7,587,171 B2 * | 9/2009 | Evans et al. | 455/63.1 |
| 2001/0045494 A1 | 11/2001 | Higgins | |
| 2003/0017803 A1 | 1/2003 | Rubin et al. | |
| 2003/0054760 A1 | 3/2003 | Karabinis | |
| 2003/0073404 A1* | 4/2003 | Sauvageot et al. | 455/13.1 |
| 2003/0207684 A1 | 11/2003 | Wesel | |
| 2004/0038644 A1 | 2/2004 | Jimenez et al. | |
| 2004/0157554 A1 | 8/2004 | Wesel | |
| 2004/0203444 A1 | 10/2004 | Jarett | |
| 2005/0085186 A1 | 4/2005 | Sandrin | |
| 2005/0197060 A1 | 9/2005 | Hedinger et al. | |
| 2007/0167132 A1 | 7/2007 | Wahlberg et al. | |
| 2007/0168675 A1 | 7/2007 | Wahlberg et al. | |
| 2007/0178833 A1 | 8/2007 | Wahlberg et al. | |
| 2007/0178834 A1 | 8/2007 | Wahlberg et al. | |
| 2008/0045146 A1 | 2/2008 | Wahlberg et al. | |
| 2009/0021424 A1 | 1/2009 | Wahlberg et al. | |
| 2009/0022088 A1 | 1/2009 | Wahlberg et al. | |
| 2010/0027411 A1* | 2/2010 | Weber et al. | 370/216 |

FOREIGN PATENT DOCUMENTS

| | | | |
|---|---|---|---|
| EP | 1065806 | 1/2001 | |
| EP | 1117198 | 7/2001 | |
| EP | 1223691 | 7/2002 | |
| EP | 1014598 | 10/2004 | |
| GB | 2313743 | 12/1997 | |
| GB | 2341762 | 3/2000 | |
| JP | 62-084604 | 4/1987 | |
| JP | 09-153718 | 6/1997 | |
| JP | 10-178313 | 6/1998 | |
| JP | 2001-007637 | 1/2001 | |
| WO | WO-96/31016 | 10/1996 | |
| WO | WO-97/25785 | 7/1997 | |
| WO | WO-98/20634 | 5/1998 | |
| WO | WO-00/28678 | 5/2000 | |
| WO | WO-01/26251 | 4/2001 | |
| WO | WO-01/37588 | 5/2001 | |
| WO | WO-02/27975 | 4/2002 | |
| WO | WO-02/27976 | 4/2002 | |
| WO | WO 03026328 A1 * | 8/2002 | H04Q 7/20 |
| WO | WO-03/026328 | 3/2003 | |
| WO | WO 03026328 A1 * | 3/2003 | H04Q 7/20 |
| WO | WO-2005/093967 | 10/2005 | |
| WO | WO 2007000794 A1 * | 6/2006 | H04B 7/185 |
| WO | WO-2007/000794 | 1/2007 | |
| WO | WO 2007000794 A1 * | 1/2007 | H04B 7/185 |
| WO | WO-2007/064094 | 6/2007 | |
| WO | WO-2007/067016 | 6/2007 | |
| WO | WO-2007/082719 | 7/2007 | |
| WO | WO-2007/082720 | 7/2007 | |
| WO | WO-2007/082721 | 7/2007 | |
| WO | WO-2007/082722 | 7/2007 | |
| WO | WO-2007/090506 | 8/2007 | |
| WO | WO-2009/010253 | 1/2009 | |
| WO | WO-2009/010254 | 1/2009 | |
| WO | WO-2009/039998 | 4/2009 | |

OTHER PUBLICATIONS

Gordon, Morgan: "Principles of Communications Satellites" 1993.
Maryann Lawlor, Network-Centric Operations Go on the Road, Signal, Oct. 2005.
Phil Hochmuth, Cisco in Space, Network World, Oct. 31, 2005.
Rainger et al: "Satellite Broadcasting," 1985, pp. 267-279.
Robert A. Nelson, Antennas: The Interface with Space, Via Satellite, Sep. 1999.
International Search Report issued in International Patent Application No. PCT/EP2007/000361.
Written Opinion issued in International Patent Application No. PCT/EP2007/000361.
International Search Report issued in International Patent Application No. PCT/EP2007/000362.
Written Opinion issued in International Patent Application No. PCT/EP2007/000362.
International Search Report issued in International Patent Application No. PCT/EP2007/000363.
Written Opinion issued in International Patent Application No. PCT/EP2007/000363.
International Search Report issued in International Patent Application No. PCT/EP07/000364.
Written Opinion issued in International Patent Application No. PCT/EP07/000364.
International Search Report issued in International Patent Application No. PCT/EP2007/000365.
Written Opinion issued in International Patent Application No. PCT/EP2007/000365.
International Search Report issued in International Patent Application No. PCT/EP2008/005722.
Written Opinion issued in International Patent Application No. PCT/EP2008/005722.
International Search Report issued in International Patent Application No. PCT/EP2008/005723.
Written Opinion issued in International Patent Application No. PCT/EP2008/005723.
Invitation to Pay Additional Fees and partial international search results issued in International Patent Application No. PCT/EP2008/007548.
Written Opinion issued in International Patent Application No. PCT/EP2008/007548.

* cited by examiner

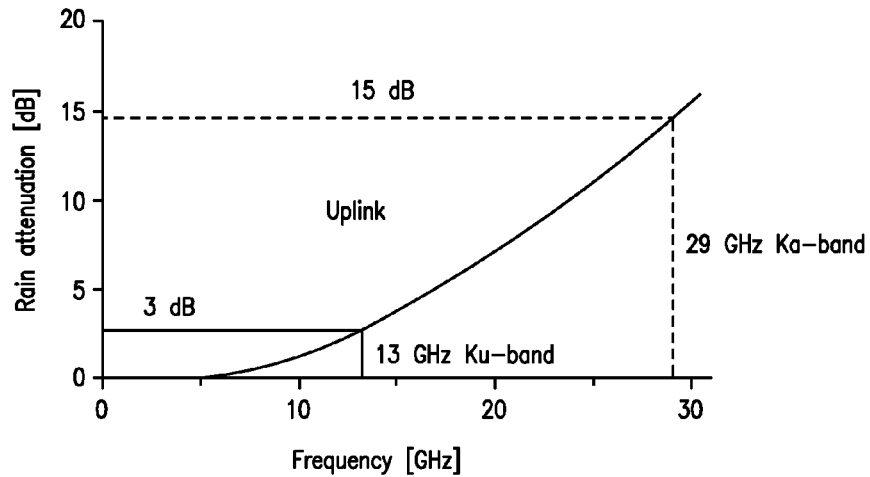
FIG. 5
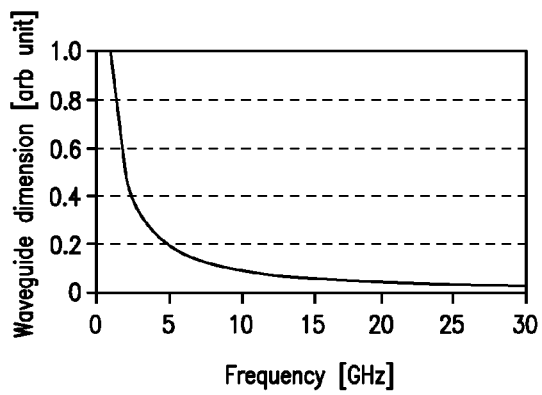 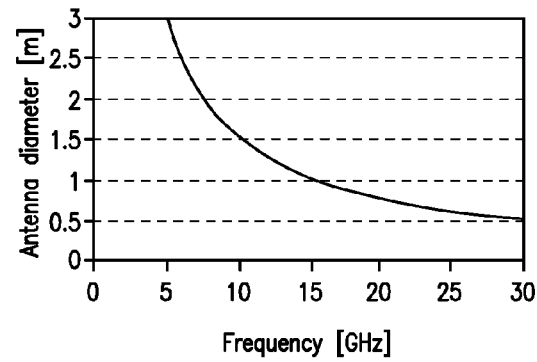
FIG. 6a        FIG. 6b

METHODS COMPRISING SATELLITES HAVING A REGENERATIVE PAYLOAD, ONBOARD COMPUTER, PAYLOAD INTERFACE AND INTERFERENCE ELIMINATION SYSTEM

FIELD OF THE INVENTION

This invention relates to systems and methods for satellite communications.

BACKGROUND OF THE INVENTION

Market demand for satellite services with continual connectivity communications using on-the-move and mobile terminals is rapidly increasing. Many customer segments are interested in using open standard technologies to secure such connectivity availability from several suppliers, in a manner similar to that implemented by the cellular mobile phone industry via Global System for Mobile Communications ("GSM"), for example. However, current terminals available for on-the-move and mobile applications are expensive, often use proprietary single source spread spectrum waveforms, and come in large, bulky, and heavy formats that require larger vehicles for transportation.

It is problematic to use small antennas for transmitting open standard waveforms using channel access methods such as frequency division multiple access ("FDMA"), time division multiple access ("TDMA"), multiple frequency time division multiple access ("MF-TDMA"), and all other types of non spread spectrum waveforms. Small antennas have broad antenna lobes and hence transmit power over a large angular region, causing harmful interference to adjacent satellites. This interference problem is illustrated in FIGS. 1 and 2. FIGS. 1 and 2 show the satellite arc of a crowded frequency band 100, 200 over the Earth's horizon 102, 202. The beam 104 from a standard sized satellite communication antenna 106 to a target satellite 108 transmits power over a small enough angular region to avoid causing interference to adjacent satellites 110. In contrast, because the beam 204 from a smaller antenna 206 to a target satellite 208 has a broader angular region, adjacent satellites 210 are subjected to interference.

The "pay-when-use" billing method (i.e., paying for services only when actually using the service) for fixed satellite service ("FSS") capacity and mobile ad hoc environments often forces customers to pay for larger bandwidth and longer duration than what is desired or necessary. The pay-when-use billing structure of a mobile satellite service ("MSS") is expensive because MSS uses lower frequency bands, including L-band, with limited total accessible satellite spectrum. Further, these systems also have low bandwidth throughput capability.

There is, therefore, increasing but unmet demand for a satellite service solution that enables mobile and on-the-move terminals with certain features.

SUMMARY OF THE INVENTION

Embodiments of systems and methods according to the present invention address, at least in part, the above-described needs by providing reliable satellite communications systems for moving terminals, including but not limited to on-the-move and mobile terminals (e.g., on-the-pause terminals), and methods for implementing the same, according to various aspects of the present invention. By combining smaller antennas, high data throughput, open standard waveforms, flexible payment options, interference detection and avoidance, and low cost components, mobile and on-the-move satellite services can achieve mainstream status amongst new consumer segments.

In an embodiment of one aspect of the present invention, system components and functions may include one or more of the following features and advantages: mechanism for selecting a sparsely populated frequency band; adaptive coverage (e.g., via steerable transmit and receive spot beams or more advanced dynamic beam forming methods to produce high sensitivity receive beams); a mobile service; user terminal antennas to actively track the satellite(s) in the system; small satellites (e.g., 800 kg launch mass or less) that are dedicated for this service (see, for example, commonly assigned and copending U.S. patent application Ser. No. 11/623,799, incorporated herein by reference in its entirety); and mechanisms for continuously adapting the coverage and/or changing orbital location to avoid interference if new satellites enter the frequency band with minimal angular separation. A potential advantage of such an embodiment is that it may result in a specialized service that is not directed to a mass market, but is a niche service with dedicated users.

In another of its aspects, systems and methods according to the present invention may dynamically select orbital positions to minimize the interference for certain coverage if such interference is detected.

User terminals and/or target terminals may, in embodiments of the present invention, be equipped with antennas that are small enough to be transported for a majority of on-the-move and mobile applications. These antennas may operate at lesser populated frequencies within the Ku-band to facilitate high data throughput while also maintaining a smaller fundamental length scale for all system components.

The satellite system equipment may advantageously be less costly because a chosen frequency band may also be operated by terrestrial microwave links, and much of the existing equipment currently utilized for such links can be modified for use in embodiments of invention.

Furthermore, billing methods may also be improved according to aspects of the present invention. Existing pay-when-use billing structures of FSS may be adopted at reduced overall costs because the Ku-band has greater accessibility than the other frequency bands currently used by FSS.

Systems and methods according to the present invention may also utilize regenerative payload on the system satellites in order to improve the link budget. This feature in combination with high sensitivity receive beams may advantageously reduce harmful interference towards adjacent satellites.

The regenerative payload can also be configured, in accordance with the present invention, to comport with open standard waveforms, which improves the availability rate of on-the-move and mobile communications.

To continuously monitor for potential interference towards neighboring satellites during operation, systems and methods according to embodiments of the invention may also implement a payload interface to connect an interference elimination system. The interference elimination system, according to embodiments of the present invention, monitors the influx of new satellites and adjusts parameters accordingly when interference is detected.

In another primary aspect, systems and methods according to the present invention utilize or provide at least one satellite for receiving and transmitting signals in a satellite communications system for moving terminals. In one particular embodiment, the satellite implements a payload interface to facilitate payload communications with onboard systems such as a regenerative payload and an onboard computer.

The payload interface, according to an embodiment of an aspect of the invention, may comprise input ports for connecting to various onboard systems, and output ports for connecting to the satellite payload. The payload interface may be configured to communicate with both the onboard systems and the satellite payload.

According to yet another embodiment of systems and methods according to the present invention, a satellite communications system is moved to a sparsely populated frequency band and monitors for interference towards adjacent satellites from an uplink signal from a user terminal to a target satellite within the satellite communications system. If such interference is detected, the system can remedy the interference through various embodiments of the invention.

BRIEF DESCRIPTION OF THE DRAWINGS

Various aspects of the systems and methods according to the present invention are described in the figures identified below and in the detailed description that follows.

FIG. 5 shows rain attenuation (dB) as a function of frequency (GHz)

FIG. 6a shows waveguide dimension as a function of frequency (GHz).

FIG. 6b shows a minimum antenna diameter required for interference-free operations on a satellite segment with 2° spacing between neighboring satellites as a function of frequency (GHz).

DETAILED DESCRIPTION

Figure 1:
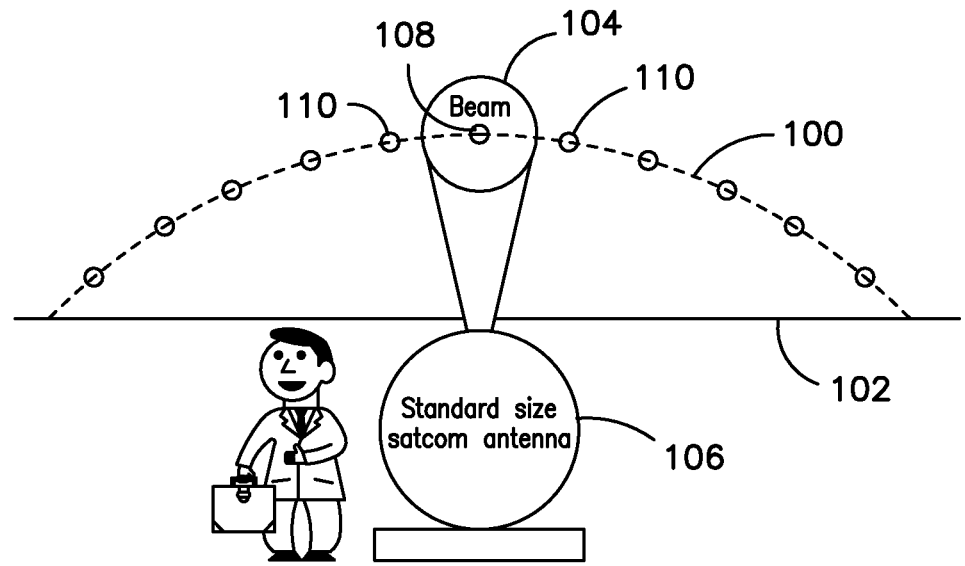
FIG. 1 shows a standard size satellite communications antenna avoiding interference to adjacent satellites in a crowded frequency band with a human shown to suggest scale.

This description, including the figures, describes embodiments that illustrate various aspects of the present invention. These embodiments are not intended to, and do not, limit the scope of the invention to particular details.

Commonly assigned and copending U.S. patent applications, identified by application Ser. Nos. 11/623,799; 11/623,821; 11/623,877; 11/623,902; and 11/623,986, all filed on Jan. 17, 2007, are incorporated herein by reference in their entirety.

The various entities identified in the Figures and described herein may each utilize one or more computer processors, and the computer processors of each entity may be configured to communicate with the computer processors of one or more of the other entities in order to carry out the methods of the present invention.

Systems and methods according to the present invention address, at least in part, a solution to the drawbacks of existing satellite systems using on-the-move and mobile terminals. Some features and advantages associated with the present invention may include: smaller antennas (e.g., aperture area with diameter less than 50 cm); high availability communication with high transmit and receive data rates (e.g., above 0.5 Mbps); open standard waveforms to secure availability from several suppliers; payment for service only when using the terminal; no harmful interference to adjacent satellites; and low cost.

To provide for at least some of the above features and advantages described above, taken alone or in combinations of some or all of them, one potential solution might seem to be to use higher frequency bands leading to a decrease in wavelength and to a corresponding decrease in the fundamental length scale for the components. However, as described below, this approach is not presently believed to provide a viable alternative for services that require both high data rates and high availability, as is typically the case for on-the-move and mobile services.

The International Telecommunications Union ("ITU") has allocated the available radio frequency spectrum for different uses and users. The main frequency bands with more than 50 MHz of bandwidth (note: a bandwidth above approximately 50 MHz is required to provide high bandwidth for multiple users within each spotbeam coverage) reserved for satellite communications are C-band, X-band (government and military users), Ku-band and Ka-band. Above Ka-band, several more satellite bands exist. However, these are not presently considered feasible options because they suffer from even greater propagation losses and rain attenuation than Ka-band.

It is also desirable that there be good availability of radio frequency ("RF") components in the chosen frequency band, and that these components are reasonably priced. This is another reason believed to disqualify higher frequencies than Ka-band. Because higher frequency bands are not used for commercial communication, but primarily for governmental use and research, the components are not available at a low cost. Also, X-band components are more expensive as a result of stressed requirements and lower volumes. Therefore, the need for high availability of low cost components limits the band alternatives to C-band, Ku-band, and Ka-band.

Figure 4:
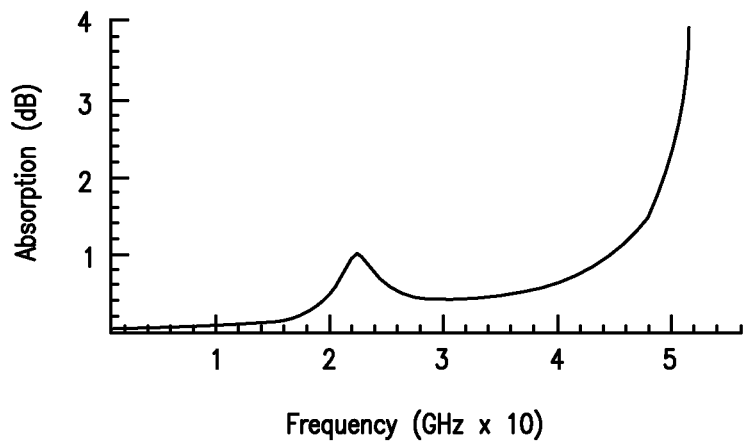
FIG. 4 shows atmospheric absorption loss (dB) as a function of frequency (GHz).

Although potential interference on adjacent satellites could be reduced by using frequencies above Ku-band, atmospheric effects and rain attenuation become problematic. FIGS. 4 and 5 graph the corresponding absorption and rain attenuation for given frequencies in order to achieve 99.9% availability. As evidenced by these graphs, the typical link margin required on the Ka-band (27-40 GHz) to achieve 99.9% availability is greater than 15 dB on an uplink of 30 GHz (i.e., approximately 0.5 dB absorption plus approximately 15 dB rain attenuation). This corresponds to an increase in output power by more than 30 times on the uplink to maintain an equal link, and such margins are not feasible to implement in a mobile terminal. As a temporary workaround, it is possible to accept a lower availability rate or to decrease the bandwidth by around 30 times (e.g., from 512 kbps down to about 16 kbps) during severe rain fades. Although this might be acceptable for certain internet services, it is not acceptable for on-the-move and mobile services where the service must be available with a high probability and with a specific throughput (e.g., at 512 kbps it is possible to transmit live video content, but not at 16 kbps). Hence, Ka-band and higher frequencies are unsuitable for this service.

On the other hand, decreasing the frequency to, say, C-band will decrease the atmospheric absorption and rain attenuation, but in order to generate the same data throughput, results in larger waveguides, antennas, and other components due to the increased wavelength. This general phenomenon is evidenced graphically in FIGS. 6a and 6b. As illustrated in FIG. 6a, the waveguide dimension increases exponentially as frequency decreases in order to maintain 99.9% availability. FIG. 6b demonstrates that the minimum antenna diameter needed to ensure virtually interference-free operations on a satellite segment with 2° spacing between neighboring satellites also increases exponentially as frequency decreases.

Figure 2:
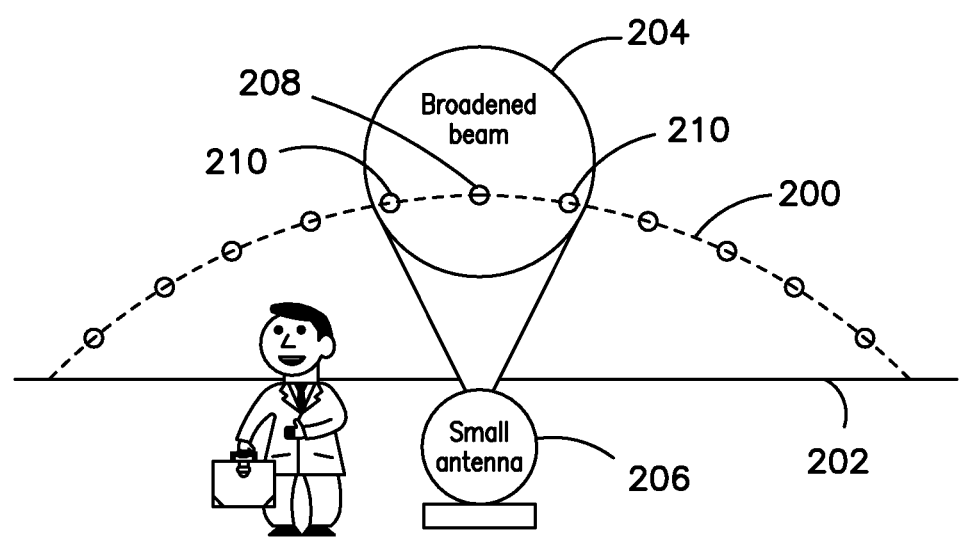
FIG. 2 shows a small satellite communications antenna causing interference to adjacent satellites in a crowded frequency band with a human shown to suggest scale.

In order to implement a satellite system with fairly small, low cost components and high availability, Ku-band may be a good compromise. However, the standard Ku-band (uplink 14.0-14.5 GHz) is fairly crowded and using an antenna smaller than around 50 cm is not possible without causing harmful interference towards adjacent satellites in the band, as illustrated in FIG. 2. Therefore, although Ku-band may be preferred because it represents an acceptable compromise for the physical parameters, it may be difficult to use with small antennas because the band is generally crowded with existing satellites.

Systems and methods according to the present invention implement user terminals with smaller antennas to be transported on a variety of vehicles, both large and compact, or directly on a person, such as in a backpack, for on-the-move and mobile applications. In one embodiment of the invention, these antennas have an aperture area with a diameter less than 50 cm.

To implement such smaller antennas with high data throughput (e.g., for voice communications or approximately 0.5 to 8 Mbps), frequencies at Ku-band (11-18 GHz) may be used. At Ku-band, the wavelength is approximately 2 cm, which sets the fundamental length scale of waveguides, antennas and other components.

In order to achieve high link availability, one embodiment of an aspect of the invention overcomes typical rain attenuation by incorporating reasonable link margins (e.g., up to 5 dB). With such link margins, it is possible to achieve link availability per year on the order of 99.9%.

Figure 7:
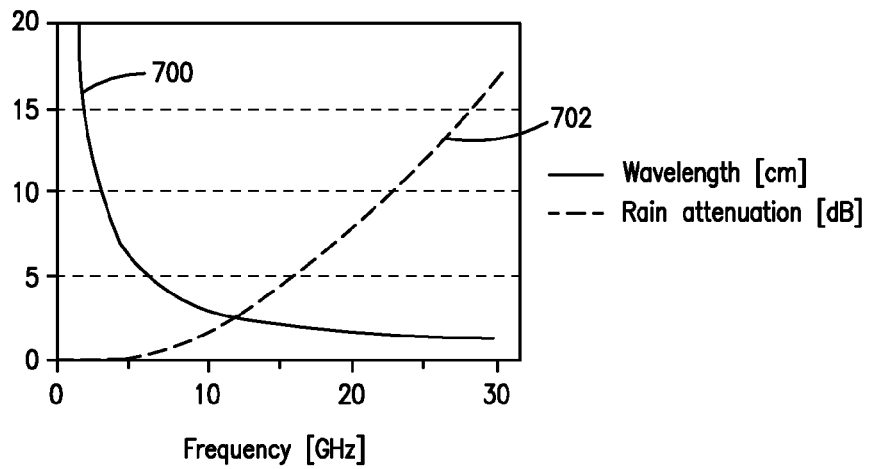
FIG. 7 shows rain attenuation (dB) and wavelength (cm) as a function of frequency (GHz).

A possible rationale for operating at Ku-band is summarized in FIG. 7 where the fundamental dimension (the wavelength) 700 and the typical rain attenuation 702 is shown as a function of frequency for a link with 99.9% availability. FIG. 7 shows the two curves 700, 702 crossing at 12-13 GHz, which means that if the frequency is either increased or decreased, one of the curves will move up, i.e., away from a fairly favorable value. Hence, the crossing region indicates where it is possible to implement reasonable link margins while simultaneously keeping the size of standard components small.

Figure 3:
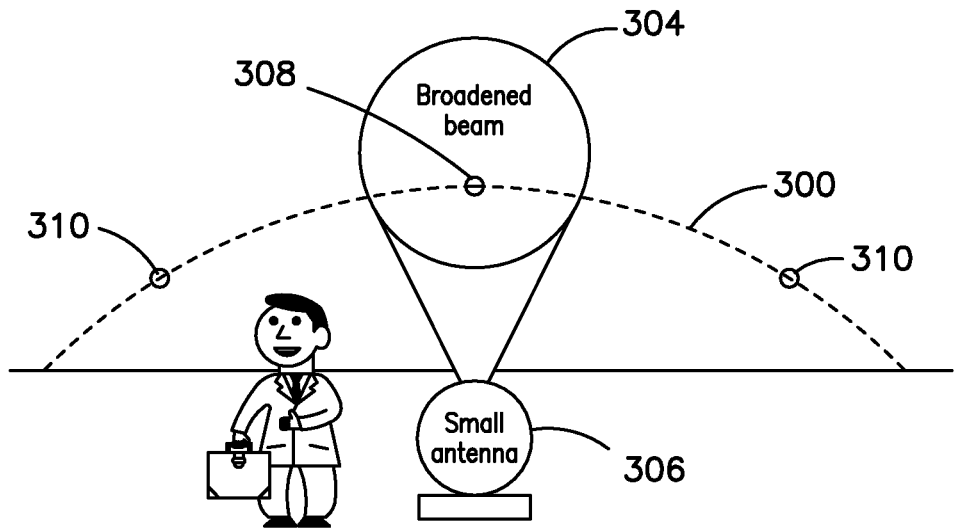
FIG. 3 shows a small satellite communications antenna avoiding interference to adjacent satellites in a sparsely populated frequency band with a human shown to suggest scale, in accordance with principles of the present invention.

In addition, placing satellites 308 in geostationary or other type of geosynchronous orbit using a part of the spectrum where there are no or very few adjacent satellites 310 operating on the same parts of the spectrum 300 (+/− the typical terminal interference region) as illustrated in FIG. 3 could be a key factor in avoiding interference caused by a smaller antenna's 306 broader beam 304. Making use of such a frequency band and equipping the satellite 308 with steerable transmit and receive spot beams in addition to its overall movement capabilities, and a regenerative payload (as needed in order to close the link with small antennas), may help to avoid interference from adjacent satellites 302.

Therefore, an advantageous choice of frequency band may be 12.75-13.25 GHz for uplink and 10.7-10.95 GHz, 11.2-11.45 GHz for the downlink. The frequency (12.75-13.25 GHz) is used by terrestrial microwave links and, although available for satellite communications, is used very scarcely for that purpose. The reasons this frequency band is relatively underdeveloped are partly regulatory and partly because of the overlap with terrestrial microwave links. The regulatory setup makes it difficult to launch a satellite on a commercial basis with a traditional satellite design and business case because typically the customer base will not be large enough to sustain a sound business case. However, for a niche service with a small satellite platform and certain flexibility it is possible to operate commercially under these conditions.

Because the frequency band is also operated by terrestrial microwave links, the equipment for this market is produced in large volumes (compared to satellite communication only bands), making it is possible to utilize low cost microwave components. Hence, embodiments of the invention enable the design and manufacture of small, low cost terminals that provide a service with high bandwidth, low cost, and high reliability. Also, the antenna sizes used for the microwave links comport well with a proposed size for the satellite service (i.e., less than 50 cm). In another embodiment of the invention, these microwave link components are reused for satellite communication links by designing the system to be compliant with this type of equipment. By doing so, this embodiment of the present invention may further enable the development of small and low cost satellite communication terminals.

In another embodiment of the invention, the billing method currently used by FSS is adopted. Because this embodiment uses the Ku-band as opposed to the L-band, which conversely has limited total accessible satellite spectrum, the typical cost for the same billing method should not as impedimentary.

An important component of an embodiment of the present invention is the use of a regenerative payload on the system satellites. A regenerative payload can improve link budget, allow mesh communication between terminals (i.e., direct connection from terminal A to terminal B without passing through a ground based hub), save bandwidth due to the direct communication path between terminals, and shorten delay time over the link that facilitates interactive communication, including TCP-IP communication.

In another embodiment of the invention, the user terminals utilize high sensitivity receive beams in conjunction with the regenerative payload on the system satellites to further a reduction in interference levels towards neighboring satellites.

In yet another embodiment of the invention, the regenerative payload could further be developed so that ground terminals are compatible with high data rate mobile telephones technology, enabling the use of open standard waveforms and terminals that also use very low cost and easily available technology on the modem and baseband side. This may be implemented by placing a mobile phone base station in orbit onboard a system satellite with adaptations to the satellite link, which may include delay times, typical fading scenarios, and echo cancellation. This payload could also be cross connected to a standard satellite communications part of the payload (such as a regenerative DVB-RCS or DVB/S2-RCS), that would allow typical satellite communications equipment to interconnect with the mobile phone base station directly in the satellite. Combining these features into a satellite communications system would enable the design of a complete satellite communications terminal by reusing off-the-shelf products from the mobile telephone industry and microwave links. This results in a price reduction of the satellite communications terminal by as much as a factor of 10 compared to the least expensive satellite communications terminals available today (approximately $2000 USD for a VSAT terminal).

Figure 8:
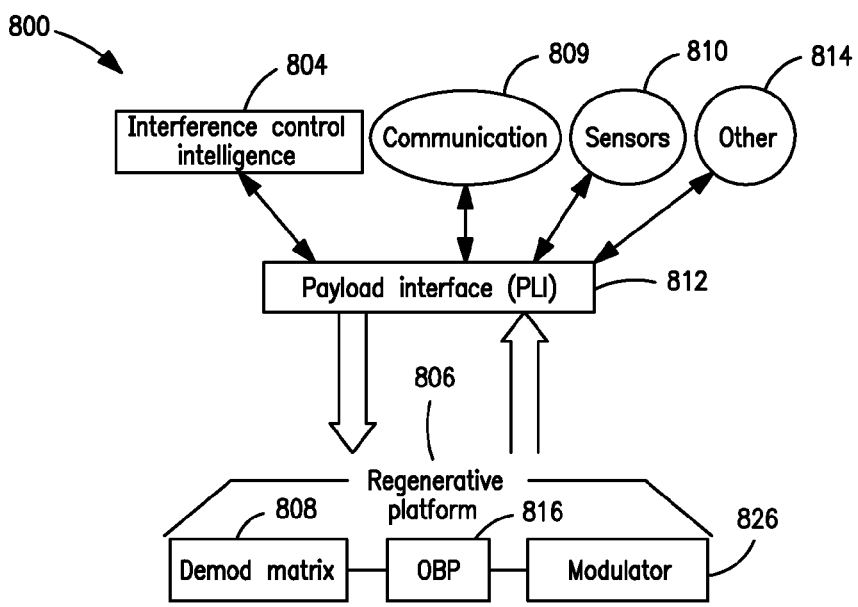
FIG. 8 shows a payload interface with related components in an embodiment of an aspect of the present invention.

Referring to FIG. 8, another embodiment of the invention implements a payload interface to facilitate payload communication with various onboard systems 800. According to one embodiment, an interface device 812 is connected to a portion of the regenerative payload 806, such as the regenerative platform 806 that encompasses the demodulation matrix 808, onboard processor 816, and modulator 826. This payload interface ("PLI") 812 may also be used to connect different applications 804, 809, 810, 814 to the payload 806 to facilitate the transfer of otherwise incompatible data types to and from the payload 806. For example, the PLI could be used to add and connect an interference measurement and analyzer 804, various onboard communication equipment 809, or sensor systems 810 to the payload 806. Additionally, the PLI 812 could, as a general interface, easily be adapted for other equipment 814 that may need to be connected to the satellite payload 806. This would facilitate an interconnection between the satellite and other onboard equipment information 814 to be transferred through the PLI 812 to the payload 806 and ultimately down to a ground receiving station.

Figure 9:
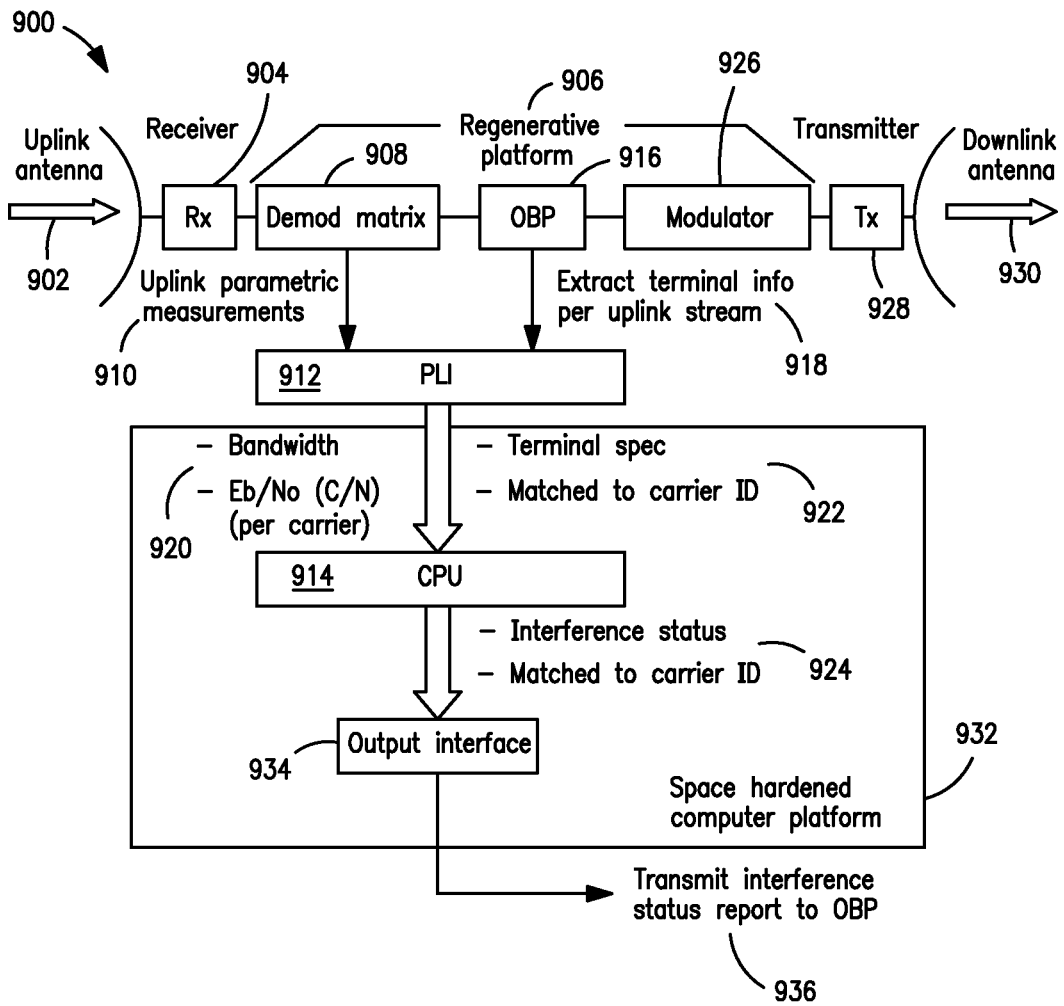
FIG. 9 shows basic components for measuring interference levels towards neighboring satellites on the uplink satellite signal.

An embodiment of the interference measurement and analyzer 804 function is illustrated in FIG. 9. If an interference situation occurs, the satellite system will detect and eliminate the interference using the implemented interference elimination system 900. This system 900 involves several possible actions to avoid and eliminate the interference. After the uplink signal 902 is received by the receiver 904, the signal is demodulated 908 to retrieve uplink parametric measurements 910 that are transmitted via the PLI 912 to an onboard computer 914. After demodulation 908, an onboard processor 916 extracts user terminal (not shown) information 918 by tracking the frequency and timing of the interference and similarly transmits the information via the PLI 912 to an onboard computer 914, which may be part of an overall space hardened computer platform 932. Using the uplink parametric measurements 910, the onboard computer 914 uses the signal bandwidth and the signal to noise ratio ($E_b/N_o$) 920 (which may be converted to a carrier-to-noise ratio, C/N) to determine whether there is adjacent satellite interference. The originating user terminal identification 922 is retrieved by the onboard computer 914 and packaged with an interference status 924. The resulting interference status report 936 is then transmitted back to the onboard processor 916 component of the regenerative platform 906 that encompasses the demodulation matrix 908, onboard processor 916, and modulator 926, via an output interface 934.

According to one embodiment of the invention, after the received signal is remodulated 926 and transmitted 928 via a downlink signal 930 to a target terminal (not shown), the interference status and originating user terminal identification 924 is also sent through a downlink signal 930 to a satellite control center regardless of whether or not interference is detected. In another embodiment, the interference status and originating user terminal identification 924 is only sent to a satellite control center if interference is detected.

If the network control center receives notice of an interfering originating terminal, the satellite control center may remedy the interference by performing one or more of the following actions: shutting down the interfering terminal(s); changing transmission parameters; changing the beam coverage on ground; changing the frequency of the affected traffic; or moving the satellite to a new orbital position.

Figure 10:
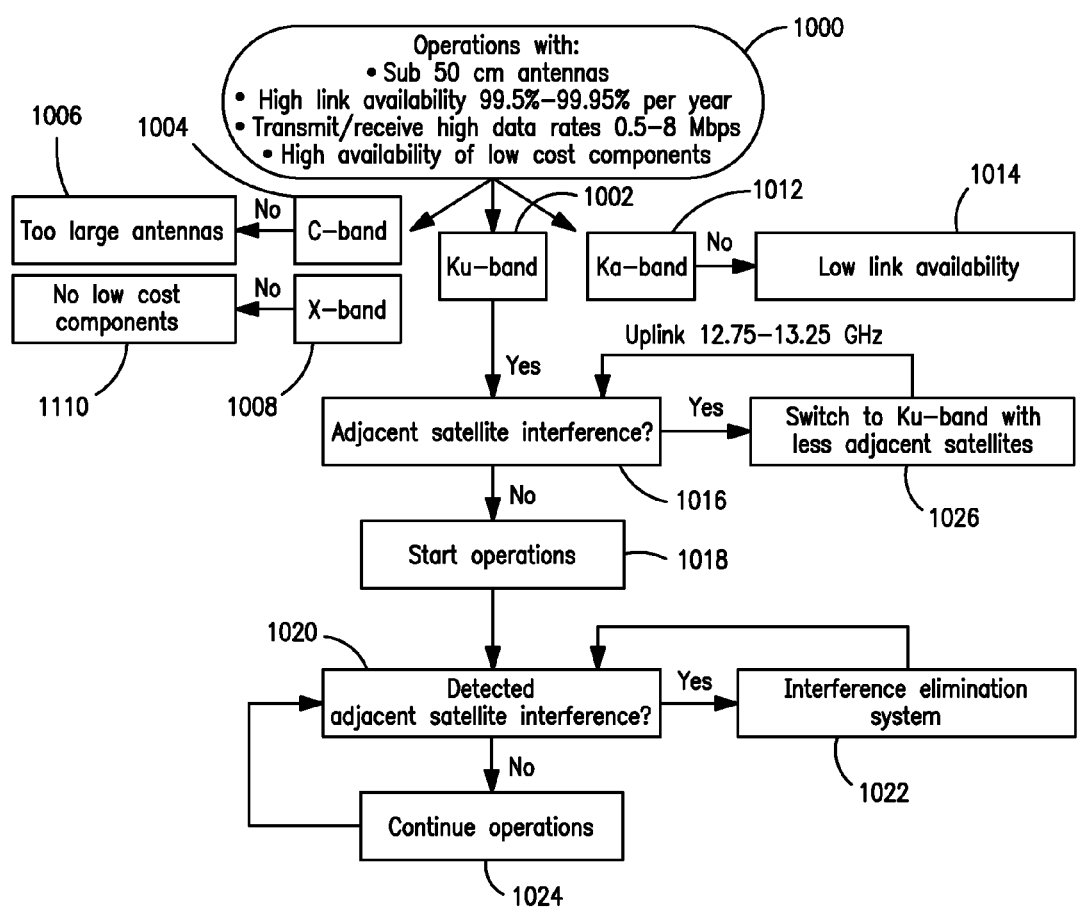
FIG. 10 shows, in flowchart form, steps associated with embodiments according to various aspects of the present invention.

Overall implementation of an embodiment of a method according to the present invention illustrated in FIG. 10. First, parameters of the system, including user terminals with small antennas, high link availability, high data rates, and low cost components, are established 1000. As explained above, only the Ku-band 1002 frequencies are selected for an embodiment of the invention because using the C-band 1004 would require large antennas 1006, X-band 1008 does not have low cost components 1010, and Ka-band 1012 has low link availability 1014. If there is adjacent satellite interference 1016, a particular frequency band range within the Ku-band, such as 12.75-13.25 GHz, with less adjacent satellites is used for the uplink signal 1026. After operations have started 1018, the system continues to monitor for satellite interference 1020, and if detected, the interference elimination system 900, 1022 remedies the interference per the method detailed above. Otherwise, operations continue 1024.

Other objects, advantages and embodiments of the various aspects of the present invention will be apparent to those who are skilled in the field of the invention and are within the scope of the description and the accompanying figures. For example, but without limitation, structural or functional elements might be rearranged, or method steps reordered, consistent with the present invention. Similarly, processors or databases may comprise a single instance or a plurality of devices coupled by network, databus or other information path. Similarly, principles according to the present invention, and systems and methods that embody them, could be applied to other examples, which, even if not specifically described here in detail, would nevertheless be within the scope of the present invention.

What is claimed is:

1. A satellite communications system for mobile terminals, the system comprising:
   a satellite configured to receive an uplink signal from one or more mobile user terminals and to transmit a downlink signal to one or more mobile target terminals in a satellite communications network, wherein:
   the one or more mobile user or target terminals comprise a small antenna having an aperture area with a diameter of less than 50 cm, and
   wherein the satellite comprises:
      a regenerative payload,
      a demodulator for demodulating the uplink signal received by the satellite,
      an onboard computer, and
      a payload interface,
         wherein the payload interface is coupled to the regenerative payload, the onboard computer and an onboard interference elimination system to enable an onboard interference analysis of the uplink signal after it has been demodulated, and
   wherein the system is optimized for a link margin of 5 dB or less.

2. The system according to claim 1 wherein the system operates on Ku-band frequencies.

3. The system according to claim 2 wherein the Ku-band frequencies are shared by satellite communication and terrestrial microwave links.

4. The system according to claim 2 wherein the Ku-band frequencies are substantially in the range from 12.75 to 13.25 GHz for the uplink signal.

5. The system according to claim 2 wherein the Ku-band frequencies are substantially in the range from 10.7 to 10.95, from 11.2 to 11.45 GHz, or both, for the downlink signal.

6. The system according to claim 1 wherein microwave components are utilized by the user terminal.

7. The system according to claim 1 wherein microwave components are utilized by the target terminal.

8. The system according to claim 1 wherein the one or more mobile user terminals are configured for mobile communications.

9. The system according to claim 1 wherein the target terminal is configured for mobile communications.

10. The system according to claim 1 wherein the one or more mobile user terminals are configured for on-the-move communications.

11. The system according to claim 1 wherein the target terminal is configured for on-the-move communications.

12. The system according to claim 1 wherein data throughput of the uplink signal and the downlink signal is greater than required to permit voice communications.

13. The system according to claim 1 wherein data throughput of the uplink signal and the downlink signal is between 0.5 to 8.0 Mbps.

14. The system according to claim 1 wherein the satellite occupies one of the groups consisting of (i) a geostationary orbit, and (ii) a geosynchronous orbit.

15. The system according to claim 1 wherein the satellite further comprises steerable transmit and receive spot beams.

16. The system according to claim 1 wherein the satellite further comprises high sensitivity receive beams.

17. The system according to claim 1 wherein one or more mobile user terminals implements a pay to use billing method.

18. The system according to claim 17 wherein the pay to use billing method is a method implemented by a fixed satellite service.

19. The system according to claim 1 wherein the regenerative payload is configured to use open standard waveforms.

20. The system according to claim 19 wherein the satellite further comprises an onboard mobile phone base station.

21. The system according to claim 20 wherein the onboard mobile phone base station is coupled to the regenerative payload.

22. The system according to claim 1 wherein the regenerative payload comprises a mobile phone base station.

23. The system according to claim 1 wherein the payload interface is coupled to at least one of the group consisting of (i) onboard communication equipment, (ii) sensor systems, and (iii) other satellite equipment.

24. The system according to claim 1 wherein the interference elimination system is configured to detect adjacent satellite interference and generate an interference status.

25. The system according to claim 24 wherein the interference elimination system is configured to transmit the interference status to a satellite control center.

26. The system according to claim 24 wherein the interference elimination system is configured to transmit the interference status to a satellite control center only if the interference status indicates the uplink signal is potentially interfering with adjacent satellites.

27. The system according to claim 24 wherein the interference elimination system performs at least one of the group consisting of (i) shutting down the one or more mobile user terminals, (ii) changing transmission parameters, (iii) changing beam coverage, (iv) changing frequency of affected signal traffic, and (v) moving the satellite to another orbital position, when the interference status indicates the uplink signal is interfering with adjacent satellites.

28. A method of implementing a satellite communications system for mobile terminals, comprising the steps of: providing a satellite configured to receive an uplink signal from one or more mobile user terminals and to transmit a downlink signal to one or more mobile terminals in a satellite communications network, wherein the one or more mobile terminals comprises a small antenna having an aperture area with a diameter of less than about 50 cm, the satellite comprising: a regenerative payload, a demodulator for demodulating the uplink signal received by the satellite, an onboard computer, and a payload interface, wherein the payload interface is coupled to the regenerative payload, the onboard computer and an onboard interference elimination system to enable an onboard interference analysis of the uplink signal after it has been demodulated; and activating the one or more mobile user terminals to send the uplink signal to the satellite, or activating the target terminal to receive the downlink signal from the satellite; wherein the satellite communications system is optimized for a link margin of 5 dB or less.

29. The method according to claim 28 wherein the system is configured to operate on Ku-band frequencies.

30. The method according to claim 29 wherein the Ku-band frequencies are substantially in the range from 12.75 to 13.25 GHz for the uplink signal.

31. The system according to claim 29 wherein the Ku-band frequencies are shared by satellite communication and terrestrial microwave links.

32. The method according to claim 29 wherein the Ku-band frequencies are substantially in the range from 10.7 to 10.95, from 11.2 to 11.45 GHz, or both, for the downlink signal.

33. The method according to claim 28 wherein microwave components are utilized by the one or more mobile user terminals.

34. The method according to claim 28 wherein microwave components are utilized by the one or more mobile target terminals.

35. The method according to claim 28 further comprising the step of configuring the one or more mobile user terminals for mobile communications.

36. The method according to claim 28 further comprising the step of configuring the one or more mobile target terminals for mobile communications.

37. The method according to claim 28 further comprising the step of configuring the one or more mobile user terminals for on-the-move communications.

38. The method according to claim 28 further comprising the step of configuring the one or more mobile target terminals for on-the-move communications.

39. The method according to claim 28 further comprising the step of configuring data throughput of the uplink signal and the downlink signal to be greater than that required to permit voice communications.

40. The method according to claim 28 further comprising the step of configuring data throughput of the uplink signal and the downlink signal to be between 0.5 to 8.0 Mbps.

41. The method according to claim 28 wherein the satellite further comprises steerable transmit and receive spot beams.

42. The method according to claim 28 wherein the satellite further comprises high sensitivity receive beams.

43. The method according to claim 28 wherein the one or more mobile user terminals implements a pay to use billing method.

44. The method according to claim 43 wherein the pay to use billing method is a method implemented by a fixed satellite service.

45. The method according to claim 28 further comprising the step of configuring the regenerative payload to use open standard waveforms.

46. The method according to claim 45 further comprising installing an onboard mobile phone base station on the satellite.

47. The method according to claim 46 further comprising the step of coupling the onboard mobile phone base station to the regenerative payload.

48. The method according to claim 28 wherein the regenerative payload comprises a mobile phone base station.

49. The method according to claim 28 further comprising coupling the payload interface to at least one of the group consisting of (i) onboard communication equipment, (ii) a sensor system, and (iii) other satellite equipment.

50. The method according to claim 28 wherein the interference elimination system is configured to detect adjacent satellite interference and generate an interference status.

51. The method according to claim 50 wherein the interference elimination system is configured to transmit the interference status to a satellite control center.

52. The method according to claim 50 wherein the interference elimination system is configured to transmit the interference status to a satellite control center only if the interference status indicates the uplink signal is potentially interfering with adjacent satellites.

53. The method according to claim 50 further comprising the step of configuring the interference elimination system to perform at least one of the group consisting of (i) shutting down the one or more mobile user terminals, (ii) changing transmission parameters, (iii) changing beam coverage, (iv) changing frequency of affected signal traffic, and (v) moving the satellite to another orbital position, when the interference status indicates the uplink signal is interfering with adjacent satellites.

54. The method according to claim 28 wherein the step of providing a satellite comprises launching the satellite into orbit.

55. The method according to claim 54 wherein the satellite is launched into one of the groups consisting of (i) a geostationary orbit, and (ii) a geosynchronous orbit.

56. A method of operating a satellite communications system for mobile terminals, wherein the satellite communications system comprises: a mobile user terminal comprising a small antenna having an aperture area with a diameter of less than about 50 cm, and one or more satellites having a regenerative payload, a demodulator for demodulating an uplink signal sent by the mobile user terminal and received by the satellite, an onboard computer and a payload interface, wherein the payload interface is coupled to the regenerative payload, the onboard computer and an onboard interference elimination system to enable an onboard interference analysis of the uplink signal after it has been demodulated, and the satellite communications system is optimized for a link margin of 5 dB or less, the method comprising the steps of: adjusting the satellite communications system from a first frequency band to a second frequency band that is less populated than the first frequency band; monitoring for interference towards adjacent satellites from the uplink signal; and remedying the interference when the interference to the adjacent satellites from the uplink signal is detected.

57. The method according to claim 56 wherein the monitoring is continuously preformed.

58. The method according to claim 56 wherein the interference is remedied by means of at least one of the group consisting of (i) shutting down the mobile user terminal, (ii) changing transmission parameters, (iii) changing beam coverage, (iv) changing frequency of affected signal traffic, and (v) moving the satellite to another orbital position.

59. The method according to claim 56 further comprising the step of transmitting interference information to a control center.

60. The method according to claim 56 further comprising the step of transmitting interference information to a control center only if interference to adjacent satellites from the uplink signal is at least one of (i) indicated and (ii) detected.

* * * * *